United States Patent Office
3,595,699
Patented July 27, 1971

3,595,699
FUEL CELL TEMPERATURE CONTROL
John Baude, Milwaukee, Wis., assignor to Allis-Chalmers
Manufacturing Company, Milwaukee, Wis.
Filed Feb. 13, 1969, Ser. No. 798,933
Int. Cl. H01m 27/12
U.S. Cl. 136—86B     18 Claims

ABSTRACT OF THE DISCLOSURE

The invention comprises a fuel cell temperature control which anticipates heating by internal losses generated as a result of fuel cell load current variation and initiates cooling in advance of the actual time the temperature rise is sensed by the temperature detecting means. A differential amplifier receives a first input signal which is a function of the rate of change of fuel cell current and time and a second input signal which is a fuction of fuel cell temperature, and means responsive to the output from the differential amplifier regulate the flow of coolant through a heat exchanger in heat transfer relation with the fuel cell.

---

This invention relates to fuel cells that convert free energy of a chemical reaction directly to electrical energy and more particularly to temperature controls for fuel cells.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Known temperature controls for electrical power sources such as fuel cells are thermally responsive devices which regulate the transfer of heat between a heat source and the fuel cell as a function of the variation of the fuel cell temperature from a predetermined magnitude. Such fuel cell temperature controls have a low level of performance because the temperature of a fuel cell varies with internal losses within the fuel cell, and thus fluctuates with the magnitude of load current which the fuel cell supplies to a load. A relatively long time delay exists between a change in load current supplied by the fuel cell and the resultant variation in fuel cell temperature sensed by the heat responsive element and generated by internal heat losses caused by such change in current. When changes in load current occur at frequent intervals, the thermally reponsive sensing device may not detect the temperature change caused by one variation in load current before a subsequent change in load current occurs which may result in further alteration of fuel cell temperature, thereby resulting in temperature instability during load swings.

It is an object of the invention to provide an improved temperature control for an electrical power source which compensates for the thermal delay between a change in load current supplied by the power source and the modification in temperature resulting from internal losses generated within the power source by such change of load current.

It is a further object of the invention to provide a fuel cell temperature control which anticipates heating of the fuel cell by internal losses generated as a result of load current variation and initiates cooling of the fuel cell well in advance of the actual time the fuel cell temperature rise is sensed by the temperature detecting device. Another object is to provide such a fuel cell temperature control which also anticipates decrease in fuel cell temperature as a result of removal of load and initiates the reduction of coolant flow well in advance of the time that the temperature sensing device detects the actual drop in fuel cell temperature caused by such reduction in load current.

These and other objects and advantages of the invention will be more readily apparent from the following detailed description when considered in conjunction with the accompanying drawing wherein.

Figure 3:
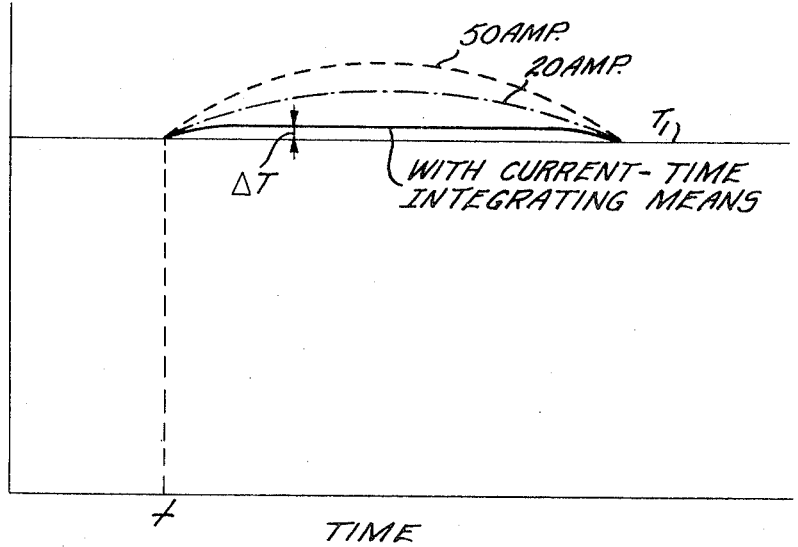
Figure 4A:
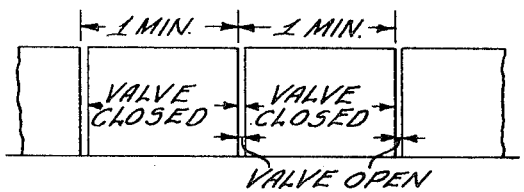
Figure 4B:
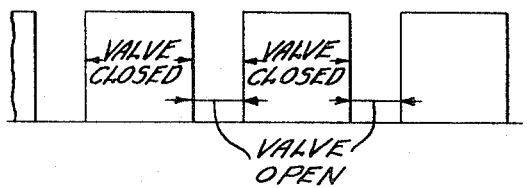

FIG. 3 is a graph plotting temperature detected by the thermal sensing device versus time and schematically illustrating how the invention anticipates heating due to internal losses resulting from change of fuel cell current and initiates cooling in advance of the time that temperature rise is sensed by the temperature detecting means; and FIGS. 4a and 4b illustrate variation in the intervals of time during which the coolant flows to the fuel cell as a result of differences in load current.

Figure 2:
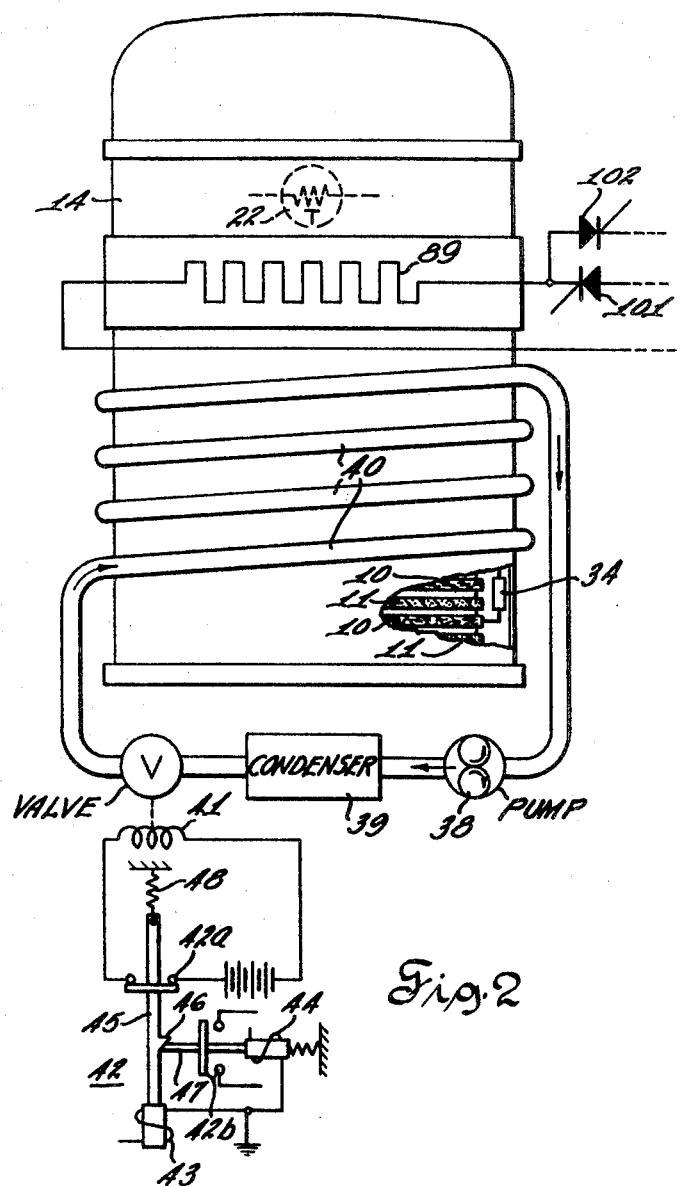
FIG. 2 is a schematic representation of a fuel cell incorporating the temperature control of FIG. 1.

The invention will be described in reference to a fuel cell electrical power source wherein the fuel is hydrogen and the oxidant is oxygen having electrodes 10 and 11 shown in FIG. 2 arranged in a stack and enclosed in a canister 14. The stack of electrodes may comprise a plurality of two-cell sections (not shown) wherein the cells are connected in parallel and the sections are connected in series to provide the desired output voltage.

Figure 1:
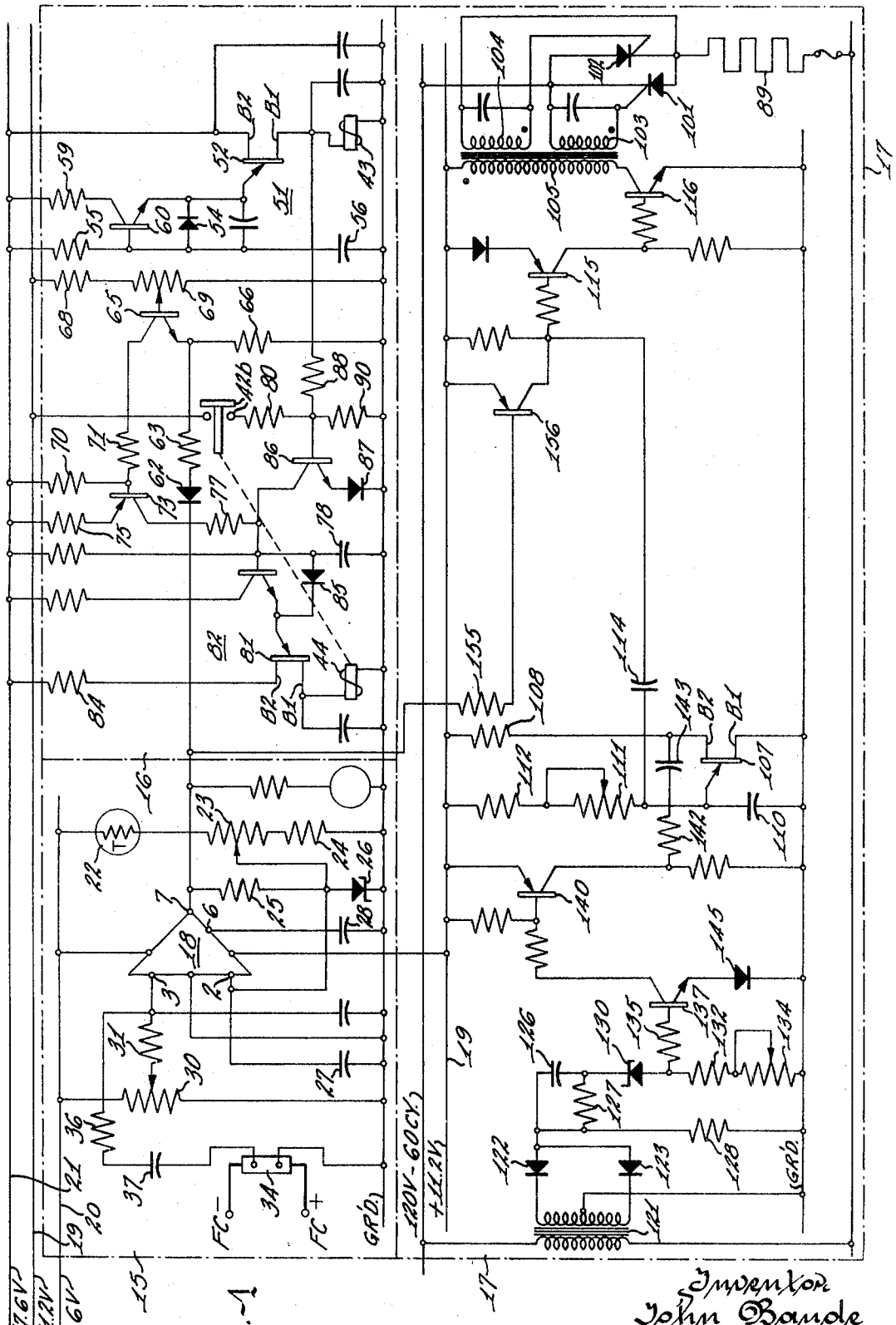
FIG. 1 is a schematic circuit diagram of a preferred embodiment of the fuel cell temperature control of the invention.

The temperature control of the invention illustrated in FIG. 1 includes incipient temperature-correction demand sensing means 15, coolant control means 16, and heating control means 17 each of which is illustrated as a dot-dash rectangle and includes the components shown therein.

INCIPIENT TEMPERATURE-CORRECTION DEMAND SENSING MEANS

Sensing means 15 includes a high gain differential amplifier 18, which may be of the operational amplifier, integrated circuit type and receives electrical power over conductors 19, 20 and 21 from a regulated power supply (not shown) which maintains bus 19 at a positive potential of +11.2 volts, bus 20 at a negative potential of −5.6 volts, and bus 21 at a positive potential of +17.6 volts.

Incipient temperature-correction demand sensing means 15 also includes means for generating a signal which is a function of fuel cell temperature and many comprise a thermistor 22 embedded in the fuel cell electrodes within canister 14 (see FIG. 2) and connected in series with a potentiometer 23 (see FIG. 1) and a resistor 24 between the −5.6 volt supply conductor 20 and the ground bus. Thermistor 22 has a negative temperature coefficient so that its resistance decreases with increase in temperature. The movable slider of potentiometer 23 is connected to the inverting input terminal pin 2 of the differential amplifier 18 and derives a signal which is a function of the temperature within fuel cell canister 14. A feedback resistor 25 is connected between the output terminal pin 7 and the inverting input terminal pin 2 of differential amplifier 18 for adjustment of the amplifier gain. A Zener diode 26 is connected between input terminal pin 2 and the ground bus to protect the differential amplifier 18 from being connected directly to the −5.6 volt bus 20 in the event that the circuit to thermistor 22 is accidentially opened. Zener diode 26 limits the input signal on terminal pin 2 to a voltage which will not damage differential amplifier 18. Capacitors 27 and 28 are connected respectively between the terminal pins 2 and 6 and the ground bus to stabilize the input voltage to differential amplifier 18.

The slider of a bias potentiometer 30 connected between the −5.6 volt supply conductor 20 and the ground bus is coupled through a resistor 31 to the noninverting input terminal pin 3 of differential amplifier 18.

Incipient heating demand sensing means 15 also includes means for deriving a signal which is a function of the rate of change of fuel cell load current and time. A low resistance shunt 34 carries the load current of the fuel cell and may comprise a resistive mat embedded within plastic (shown only schematically in FIG. 2) and disposed within an air duct within canister 14 through which a coolant gas is circulated. One side of shunt 34 is connected to the ground bus, and the voltage drop developed across shunt 34 by the fuel cell load current is coupled to the noninverting input terminal pin 3 through an integrator circuit which may comprise a simple RC circuit such as a resistor 36 and a capacitor 37 as shown connected between shunt 34 and input pin 3, or alternatively the output of the integrator circuit may be coupled to the differential amplifier 18 through a preamplifier (not shown) for greater accuracy.

A biasing signal from potentiometer 30 and the signal which is a derivative of fuel cell load current and time derived from shunt 34 are applied to the noninverting input of differential amplifier 18, whereas the signal from potentiometer 23, which is a function of the resistance of thermistor 22 and thus of the temperature of the fuel cell, is coupled to the inverting input. The polarity and magnitude of these input signals are selected so that: (1) the inverting and noninverting inputs balance and differential amplifier 18 has zero output current on pin 7 when the fuel cell is at a preselected temperature and is supplying a predetermined load; (2) a signal negative-going with respect to ground is generated at output terminal pin 7 when cooling of the fuel cell is required to keep it at the preselected temperature; and (3) a signal positive-going with respect to ground is generated at output pin 7 when the fuel cell must be cooled to maintain it at the preselected temperature. The temperature at which the fuel cell is to be maintained when supplying the predetermined load current is selected by adjusting potentiometers 23 and 30. The input signal to differential amplifier 18 from the integrator circuit provides for a temporary override of the balancing point in anticipation of heating and is a function of the magnitude of fuel cell load current.

COOLANT CONTROL

A pump 38 (see FIG. 2) forces a liquid coolant such as a glycol through a condenser 39 and through cooling pipes 40 which are in heat exchange relation with fuel cell canister 14 and may remove heat by convection from a coolant gas circulated by fans (not shown) within canister 14. A normally closed valve V having an operating coil 41 regulates the flow of coolant through heat exchanger 40. Valve V is actuated to open position when operating coil 41 is energized and is controlled by the normally closed contacts 42a of a two-coil latching relay 42 which is electrically set and reset. When relay 42 is released, i.e., reset, contacts 42a complete an energizing circuit to valve operating coil 41 in series with a battery to thereby maintain valve V open. When a valve-closing coil 43 of relay 42 is energized, armature 45 of relay 42 is attracted downwardly to open contacts 42a and engage a projection 46 on armature 45 behind an armature latch 47 to maintain armature 45 in its actuated position. Opening of contacts 42a de-energizes coil 41 and thus closes valve V. Energization of valve-opening coil 44 of relay 42 attracts armature latch 47 from beneath projection 46, thereby closing normally open contacts 42b and permitting armature 45 to return to its normal position under the force of spring 48 and again close contacts 42a to energize coil 41 and open valve V.

Coolant control means 16 include a relaxation oscillator 51 comprising a unijunction transistor 52 having base B2 connected to the +17.6 volt bus 21 from the regulated power supply, base B1 connected through valve-closing relay coil 43 to the ground bus, and its emitter connected through a diode 54 to the junction between a resistor 55 and a capacitor 56 of an RC circuit connected between the +17.6 volt bus 21 and the ground bus. The emitter of unijunction transistor 52 is also connected to bus 21 through the collector resistor 59 and the emitter-collector circuit of a transistor 60 having its base coupled to the junction between resistor 55 and capacitor 56. The emitter of unijunction transistor 52 is reverse biased at the beginning of the operating cycle and hence unijunction transistor 52 is nonconducting. Capacitor 56 is charged through resistor 55 and transistor 60, and the voltage on the emiter of unijunction transistor 52 rises exponentially toward the potential of bus 21. After a predetermined time delay, which preferably is approximately sixty seconds, the emitter of unijunction transistor 52 becomes forward biased and the dynamic resistance between emitter and base B1 drops to a low value. Capacitor 56 then discharges through the emitter-base B1 circuit and valve-closing relay coil 43 to latch armature 45 and thus close valve V. When the emitter reaches the minimum emitter voltage, the unijunction transistor 52 ceases to conduct and the cycle is repeated. Transistor 60 maintains a constant charging current for capacitor 56 and also provides part of the current for energizing relay coil 43 through the conducting unijunction transistor 52. Diode 54 provides temperature stability and a path for surge currents.

As described hereinbefore, the output signal on pin 7 of differential amplifier 18 is negative-going when coolant fluid must be supplied to heat exchanger 40 to cool the fuel cell to the preselected temperature, and such negative-going signal is coupled through a diode 62 and a resistor 63 to the emitter of a transistor 65 and develops a voltage across a resistor 66 connected between the emitter and the ground bus. The base of transistor 65 is biased by a voltage divider comprising a resistor 68 and a potentiometer 69 connected between the +11.2 volt bus 19 and the ground bus. The collector of transistor 65 is connected to the +17.6 volt bus 21 through two collector resistors 70 and 71 in series. The negative-going signal on differential amplifier output pin 7 developed across resistor 66 forward biases the emitter of transistor 65 and causes it to conduct.

A capacitor-charging transistor 73 has its base coupled to the junction of resistors 70 and 71, its emitter connected to the +17.6 volt bus 21 through a resistor 75, and its collector connected to the ground bus through an RC time delay circuit comprising a resistor 77 and a capacitor 78. A relaxation oscillator 82, similar to relaxation oscillator 51, includes a unijunction transistor 81 having its emitter coupled to capacitor 78 through a diode 85.

When a negative-going signal on output pin 7 is coupled to the emitter of transistor 65 and causes it to conduct, the flow of collector current to transistor 65 through resistance 70 forward biases the base of transistor 73 and causes it to conduct. When transistor 73 conducts, capacitor 78 is charged through resistor 75, the collector-emitter circuit of transistor 73, and resistor 77 and builds up a voltage which eventually fires relaxation oscillator 82.

Unijunction transistor 81 has base B2 connected through a resistor 84 to the +17.6 volt bus 21, its base B1 connected through valve-opening relay coil 44 to the ground bus, and its emitter connected through diode 85 to capacitor 78. When the charge on capacitor 78 reaches a predetermined potential, the emitter of unijunction transistor 81 is forward biased, and capacitor 78 discharges through the emitter-base B1 circuit of unijunction transistor 81 and coil 44 of relay 42, thereby resetting the relay 42 and closing its contacts 42a to open valve V and permit coolant to flow through heat exchanger 40.

A capacitor-discharging transistor 86 has its collector connected to capacitor 78, its emitter connected to the ground bus through a diode 87, and its base connected through a resistance 88 to base B1 of unijunction transistor 52. When unijunction transistor 52 fires every sixty seconds, the base of transistor 86 is forward biased and capacitor 78 discharges through the collector-emitter circuit of transistor 86 to quickly discharge capacitor 78 at the beginning of each operating cycle when valve V is closed. The base of transistor 86 is also connected to the junction of two resistors 80 and 90 connected between the +11.2 volt bus 19 and the ground bus in series with a set of normally open contacts 42b of relay 42 which are closed when valve-opening relay coil 44 is energized and latching armature 47 is attracted from beneath projection 46. Closing of relay contacts 42b forward biases the base of transistor 86, thereby also turning on transistor 86 to discharge capacitor 78 at the beginning of the flow of coolant fluid through valve V to heat exchanger 40.

Energization of valve-closing relay coil 43 by a pulse from relaxation oscillator 51 every sixty seconds results in operation of relay 42 and closing of valve V, whereas energization of valve-opening relay coil 44 when relaxation oscillator 82 fires after a predetermined voltage builds up on capacitor 78 results in resetting of relay 42 and opening of valve V to initiate flow of coolant through heat exchanger 40. Repeated energization of valve-closing relay coil 43 without energization of valve-opening relay coil 44 between output pulses from relaxation oscillator 52 results in valve V staying closed so that substantially no cooling fluid flows through heat exchanger 40.

Should the incipient temperature-correction demand sensing means 15 detect the need to cool the fuel cell to maintain it at the preselected temperature, a negative-going signal is derived at the output terminal pin 7 of differential amplifier 18 which results in turning on of transistors 65 and 73, the charging of capacitor 78, the firing of unijunction transistor 81, and the energization of valve-opening relay coil 44 and consequent opening of valve V at some point in the operating cycle after firing of unijunction transistor 52. The interval of time after unijunction transistor 52 fires (which closes valve V) before capacitor 78 is charged to a sufficiently high voltage to fire unijunction transistor 81 (which opens valve V) is a function of the magnitude of the negative-going signal on output pin 7 of differential amplifier 18. Such negative going signal forward biases the emitter of transistor 65 and therefore determines the amount of current flowing in its collector circuit which, in turn, regulates the base current in transistor 73 and consequently the magnitude of the charging current for capacitor 78 and the portion of each operating cycle that valve V is open.

FIG. 3 schematically illustrates how the invention anticipates heating caused by internal losses resulting from change of fuel cell current and initiates cooling in advance of the time that the temperature rise is sensed by thermistor 22. FIG. 3 plots temperature sensed by thermistor 22 as ordinates versus time as abscissae. The preselected operating temperature for the fuel cell is designated $T_1$, and the graph schematically illustrates that without the current-time integrating means of the invention, the fuel cell temperature sensed by thermistor 22 would: (a) follow the dotted curve designated "50 amp." if a fifty ampere change in fuel cell current occurred at time $t$; and (b) follow the dot-dash curve designated "20 amp." if a twenty ampere change in fuel cell current occurred at time $t$. This graph also illustrates that the temperature sensed by thermistor 22 follows the solid line curve designated "With Current-Time Integrating Means" when a fifty-ampere change of fuel cell current occurs at time $t$ and is integrated by elements 36–37 and provides a negative-going signal on output pin 7 to energize valve-opening coil 44 early in the operating cycle and thus initiate coolant flow and anticipate the heating which would result from such 50-ampere change of output current. It will be noted that the variation in temperature $\Delta T$ from the preselected fuel cell operating temperature $T_1$ is substantially less in a fuel cell embodying the invention than in a fuel cell having only a thermal sensing device to control its temperature. The same increase in internal losses occur for a given magnitude of current change in a fuel cell embodying the invention and one with a prior art control, but the device of the invention anticipates the change in temperature caused by such losses and permits the coolant to remove the thermal energy faster in a fuel cell embodying the invention than in a prior art structure.

FIGS. 4a and 4b illustrate the variation in time lag between closing and opening of valve 41 which regulates the amount of coolant fluid flowing through heat exchanger 40 for light and heavy load on the fuel cell respectively. If the amplitude of the negative-going output signal on terminal 7 of differential amplifier 18 is relatively low, as illustrated in FIG. 4a, capacitor 78 will charge slowly and unijunction transistor 81 will not fire to open valve V until almost sixty seconds after the valve V is closed, whereby the valve V is closed most of the time and the coolant flow through heat exchanger 40 is restricted to practically zero. On the other hand, if the magnitude of the negative-going signal on differential amplifier output terminal pin 7 is relatively high, a relatively high charging current will flow through transistor 73 and capacitor 78 will charge quickly to effect firing of relaxation oscillator 82 and opening of valve V, for example, after a time delay of 43 seconds illustrated in FIG. 4b, whereby the valve V is open and coolant fluid flows through heat exchanger 40 for seventeen seconds out of every sixty second operating cycle.

HEATING CONTROL

After the fuel cell reaches the preselected operating temperature $T_1$, it is maintained within a narrow temperature bandwidth on opposite sides of temperature $T_1$ by regulation of the flow of coolant through valve V and heat exchanger 40.

A resistance type heater 89 in heat exchange relation with fuel cell canister 14 is connected across the power leads from a suitable 120 volt, 60 cycle power source by a pair of silicon control rectifiers, or SCR's 101 and 102 of the heating control means 17 and is used principally for ground support to initially bring the fuel cell to the preselected operating temperature. Once the fuel cell is at the desired operating temperature, the heating control means 17 only energizes heater 89 after the fuel cell temperature has decreased by a predetermined amount below the lower limit of the temperature bandwidth within which the fuel cell temperature is maintained by the coolant control means 16. The gates of SCR's 101 and 102 are connected to secondary windings 103 and 104 respectively of a transformer 105 and derive gate signals which trigger the SCR's 101 and 102 into conduction at a specific point in the cycle.

In order to minimize electromagnetic disturbances, it is preferable that current is not provided to heater 89 when the instantaneous potential of the 120 volt, 60 cycle power source exceeds an allowable maximum voltage, for example, 18 volts, and consequently SCR's 101 and 102 are gated at a preselected point on the 60 cycle sine wave before the potential reaches 18 volts. In order to accomplish this, the firing circuit for the SCR's 101 and 102 must be synchronized with the zero crossing points of the 60 cycle sine wave so that a new timing cycle will be initiated at each zero crossing.

A known relaxation oscillator for gating SCR's 101 and 102 includes a unijunction transistor 107 having its base B1 connected to the ground bus, its base B2 connected through a resistance 108 to the +11.2 volt bus 19, and its emitter coupled to the junction between a capacitor 110 and a potentiometer 111 connected in series with a resistor 112 between bus 19 and the ground bus and comprising an RC time delay circuit. The emitter of unijunction transistor 107 is reverse biased, and when capacitor 110 is charged through potentiometer 111 and resistor 112 to a predetermined voltage, the emitter becomes forward biased and capacitor 110 discharges through the emitter-base B1 circuit of unijunction transistor 107 and delivers a pulse through a capacitor 114 to the base of a transistor 115. This pulse turns on transistor 115 which in turn causes a transistor 116 to conduct and supply a pulse to the primary winding of transformer 105, thereby generating gating pulses in secondary windings 103 and 104 for SCR's 101 and 102.

As discussed hereinbefore, the SCR firing circuit must be synchronized with the zero crossing points of the 60 cycle sine wave so that a new timing cycle is initiated at each zero crossing. In order to accomplish such synchronization, capacitor 110 of the SCR firing circuit must be discharged at each zero crossing.

A transformer 121 preferably has its primary winding energized from a 120 volt, 60 cycle source and the opposite ends of its secondary winding connected to diodes 122 and 123 to form a full wave rectifier which generates a 120 cycle unidirectional reference signal. The 120 cycle reference signal is differentiated in an RC differentiator comprising a capacitor 126 coupled to the junction of diodes 122 and 123 and connected to the ground bus through series resistors 127 and 128 which discharge capacitor 126 to the ground bus at the end of each cycle. The peak signal developed across resistors 127 and 128 is impressed across the serial arrangement of a Zener diode 130, a resistor 132, and a potentiometer 134. The junction of Zener diode 130 and resistor 132 is coupled through a resistor 135 to the base of a transistor 137. Zener diode 130 conducts in the forward direction during the negative portion of the pulse from the differentiator circuit and reverse biases transistor 137 when it conducts, thereby cutting off transistor 137 and preventing it from affecting the relaxation oscillator 107 which oscillates at a frequency determined by its RC circuit comprising capacitor 110, potentiometer 111 and resistor 112.

When the output from the differentiator starts to swing in the positive direction, Zener diode 130 is cut off and generates a positive pulse when its Zener voltage is reached which forward biases transistor 137. Conduction by transistor 137 turns on a transistor 140 which, in turn, conducts and connects base B2 of unijunction transistor 107 through a resistor 142 and a capacitor 143 to the +11.2 volt bus 19, thereby firing unijunction transistor 107. Unijunction transistor 107 is thus fired regardless of the amount of charge accumulated on capacitor 110, and capacitor 110 is discharged and is ready for the next cycle.

Potentiometer 134 in series with resistor 132 and Zener diode 130 is adjusted so that the breakover point of Zener diode 130 is at the peak of the 120 cycle unidirectional reference pulses, and the peak is identical with the zero crossing point of the 60 cycle wave because of the ninety degree phase shift provided by capacitor 126. The polarities of diodes 122 and 123 are selected so that the peaks of the output signals from the differentiator are sharp and positive to form a precise zero crossing reference pulse at each zero crossing of the 60 cycle source. A diode 145 connected between the emitter of transistor 137 and the ground bus provides a small bias so that transistor 137 will remain cutoff until Zener diode 130 conducts in the reverse direction.

The output pin 7 of differential amplifier 18 is connected through a resistance 155 to the base of a transistor 156 which has its emitter coupled to the +11.2 volt bus 19. The negative-going signal on output pin 7, when cooling of the fuel cell is required, forward biases transistor 156 so that it conducts and couples the base of transistor 115 to the +11.2 volt bus 19 so that transistor 115 is nonconducting, thereby blocking pulses from the relaxation oscillator from reaching transformer 105 and preventing energization of heater 89.

When the fuel cell operating temperature drops to a predetermined temperature below the lower limit of the temperature bandwidth within which the fuel cell operating temperature is maintained by coolant control means 16 and heating of the fuel cell is required to return the fuel cell to the preselected operating temperature, the signal or output pin 7 of differential amplifier 18 becomes positive and reverse biases transistor 156, thereby turning it off and removing the clamp from the base of transistor 115 when the positive signal reaches a predetermined magnitude. Capacitor 110 is discharged at each zero crossing of the 60 cycle current as described hereinbefore, and immediately thereafter begins charging through resistor 112 and potentiometer 111. When the voltage on capacitor 110 reaches a preselected magnitude, unijunction transistor 107 fires and delivers a pulse through capacitor 114 to the base of transistor 115. This pulse turns on transistor 115 which in turn causes transistor 116 to conduct and supply a pulse to the primary winding of transformer 105, thereby generating gating pulses for SCR's 101 and 102. The frequency of the relaxation oscillator is preferably selected so that the heater current is not turned on during each cycle when the instantaneous voltage of the 60 cycle power source exceeds 18 volts.

It will be appreciated that the temperature control of the invention permits a single temperature sensing device to regulate at three different temperature levels, namely at the upper and lower limits of the temperature bandwidth within which the fuel cell temperature is maintained by the coolant control means 16 and also at the predetermined temperature at which energization of heater 89 is initiated by heating control means 17.

It should be understood that I do not intend to be limited to the particular embodiment shown and described for many modifications and variations will be obvious to those skilled in the art.

The embodiments of the invention in which an exclusive property or privilege is claimed are defined as follows:

1. In combination, an electrical power source,
    means for changing the temperature of said power source,
    means for deriving a first signal which is a function of the temperature of said power source,
    current-time integrating means for deriving a second signal which is the integral of the output current supplied by said power source with respect to time,
    a differential amplifier receiving said first and second signals as inputs, and
    means responsive to the output of said differential amplifier for controlling said means for changing the temperature of said power source.

2. In the combination of claim 1 and including means for deriving a bias third input signal to said differential amplifier and wherein said differential amplifier has an inverting input which receives said first signal and a noninverting input which receives said second and third input signals.

3. In the combination of claim 1 wherein said power source is a fuel cell and said means for changing the temperature of said fuel cell includes a heat exchanger in heat transfer relation to said fuel cell,
    valve means for controlling the flow of coolant fuel through said heat exchanger,
    means including an oscillator for cyclically closing said valve means, and
    means for opening said valve means after a time interval subsequent to its closure which is a function of the magnitude of the output signal from said differential amplifier.

4. In the combination of claim 1 wherein said electrical power source is a fuel cell and said differential amplifier provides an output signal of one polarity when the temperature of said fuel cell is above a predetermined magnitude and of the opposite polarity when said temperature is below said predetermined magnitude and said means for changing the temperature of said fuel cell includes means responsive to said output signal of said one polarity from said differential amplifier for decreasing the temperature of said fuel cell and means responsive to said output signal of said opposite polarity for increasing the temperature of said fuel cell.

5. In the combination of claim 4 and including means responsive to the magnitude of said output signal of one polarity for regulating said means for decreasing the temperature of said fuel cell and wherein said means for increasing the temperature of said fuel cell includes a heater in heat transfer relation to said fuel cell and means responsive to a preselected magnitude of said output signal of opposite polarity for energizing said heater.

6. In the combination of claim 1 wherein said electrical power source is a fuel cell and said means for deriving a first signal is a thermistor and said means for deriving said second signal includes a resistive shunt across the output electrodes of said fuel cell.

7. In the combination of claim 6 wherein said differential amplifier has inverting and noninverting inputs and including an integrating circuit coupling said shunt to one of said inputs, said means for deriving a first signal being coupled to the other input of said differential amplifier.

8. In the combination of claim 2 wherein said electrical power source is a fuel cell and means for changing the temperature of said fuel cell includes
   a heat exchanger in heat transfer relation to said fuel cell,
   means for supplying a coolant fluid to said heat exchanger, and
   means responsive to the magnitude of said output signal from said differential amplifier for regulating said means for supplying coolant fluid.

9. In the combination of claim 1 wherein said electrical power source is a fuel cell and said means for changing the temperature of said fuel cell includes
   a heat exchanger in heat transfer relation to said fuel cell, and
   means responsive to the magnitude of said output signal from said differential amplifier for regulating the flow of coolant fluid to said heat exchanger.

10. In the combination of claim 9 wherein said differential amplifier provides output signals of opposite polarities when the temperature of said fuel cell is above and below a predetermined magnitude, said means for regulating the flow of coolant fluid is responsive to the magnitude of an output signal of one polarity from said differential amplifier, said means for changing the temperature of said fuel cell also includes an electrical heater in heat transfer relation with said fuel cell, and also including means responsive to said output signal of the opposite polarity from said differential amplifier for controlling the energization of said heater.

11. In the combination of claim 9 wherein said means for regulating the flow of coolant fluid includes
   an electrically operated valve,
   means including a first relaxation oscillator for periodically closing said valve, and
   means including a second relaxation oscillator for opening said valve a predetermined interval after it is closed by said first relaxation oscillator, the period of said second relaxation oscillator being controlled by the magnitude of said output signal from said differential amplifier.

12. In the combination of claim 11 wherein said second relaxation oscillator is a unijunction oscillator whose frequency is determined by a resistance-capacitance circuit wherein said capacitance is charged through a resistance in series with the emitter-collector circuit of a control transistor, and including means responsive to the magnitude of the output signal from said differential amplifier for biasing the base of said control transistor.

13. In the combination of claim 12 wherein said differential amplifier provides output signals of opposite polaries when the temperature of said fuel cell is above and below a preselected magnitude, said means for biasing the base of said control transistor is responsive to the magnitude of an output signal of one polarity from said differential amplifier, said means for changing the temperature of said fuel cell also includes an electrical heater in heat transfer relation with said fuel cell, and also including means responsive to said output signal of opposite polarity from said differential amplifier for controlling the energization of said heater.

14. In the combination of claim 13 wherein said means for controlling the energization of said heater includes silicon controlled current rectifier means for regulating the flow of alternating current to said electrical heater, means including a third relaxation oscillator for supplying gating pulses to said controlled rectifier means, means for initiating the operating cycle of said third relaxation oscillator at each current zero of said alternating current which energizes said heater, and means for disabling said means for supplying gating pulses when the output signal from said differential amplifier is of said one polarity.

15. In combination,
   a fuel cell for supplying an output current to a load,
   means for deriving a first signal which is a function of the temperature of said fuel cell,
   current-time integrating means for deriving a second signal which is the integral of said output current and time,
   a differential amplifier receiving said first and second signals as inputs, a heat exchanger in heat transfer relation to said fuel cell, and
   means responsive ot the output signal from said differential amplifier for regulating the flow of coolant fluid through said heat exchanger.

16. In the combination of claim 15 wherein said differential amplifier provides output signals of opposite polarities when the temperature of said fuel cell is above and below a preselected magnitude and said means for regulating the flow of coolant flow is responsive to the magnitude signal of one polarity from said differential amplifier and including means responsive to said output signal of the opposite polarity for increasing the temperature of said fuel cell.

17. In the combination of claim 16 and including means for generating a bias third input signal to said differential amplifier, and wherein said means for deriving a first signal includes a thermistor and said means for deriving a second signal includes a shunt across the output electrodes of said fuel cell and an integrating circuit coupling said shunt to said differential amplifier.

18. In the combination of claim 17 wherein said means for regulating the flow of coolant fluid includes
   electrically operated valve means adapted to be closed and to remain closed until operated to the open position,
   means including a first relaxation oscillator for cyclically closing said valve means, and
   means including a second relaxation oscillator for operating said valve means to open position a preselected interval after it is operated to closed position, the period of said second relaxation oscillator being controlled by the magnitude of said output signal of opposite polarity from said differential amplifier.

References Cited
UNITED STATES PATENTS

| | | | |
|---|---|---|---|
| 3,123,086 | 3/1964 | Kleiss | 165—39X |
| 3,253,646 | 5/1966 | Kaltuniak | 165—39 |
| 3,432,356 | 3/1969 | Christianson | 136—86 |

ALLEN B. CURTIS, Primary Examiner

U.S. Cl. X.R.

165—39